United States Patent
Ramalho et al.

(10) Patent No.: US 10,003,434 B2
(45) Date of Patent: Jun. 19, 2018

(54) EFFICIENT ERROR CORRECTION THAT AGGREGATES DIFFERENT MEDIA INTO ENCODED CONTAINER PACKETS

(71) Applicant: Cisco Technology, Inc., San Jose, CA (US)

(72) Inventors: Michael A. Ramalho, Lakewood Ranch, FL (US); Dan Tan, Sunnyvale, CA (US); Geir A. Sandbakken, Oslo (NO); Paul G. Bright-Thomas, Wokingham (GB); Greg H. Hakonsen, Sokna (NO)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 15/094,475

(22) Filed: Apr. 8, 2016

(65) Prior Publication Data

US 2017/0294984 A1 Oct. 12, 2017

(51) Int. Cl.
*H03M 13/00* (2006.01)
*H04L 1/00* (2006.01)
*H04L 12/911* (2013.01)

(52) U.S. Cl.
CPC .......... *H04L 1/0041* (2013.01); *H04L 1/0057* (2013.01); *H04L 1/0083* (2013.01); *H04L 47/827* (2013.01)

(58) Field of Classification Search
CPC ..... H04L 1/0041; H04L 47/827; H04L 1/007; H04L 1/0071; H04L 1/008; H04L 1/0045;
(Continued)

(56) References Cited

U.S. PATENT DOCUMENTS 5,208,665 A * 5/1993 McCalley .............. H04H 60/14
348/E5.008
6,141,788 A 10/2000 Rosenberg et al.
(Continued)

FOREIGN PATENT DOCUMENTS

WO 2010099511 A1 9/2010
WO 2013/055180 A1 4/2013

OTHER PUBLICATIONS

Watson, et al., "Forward Error Correction (FEC) Framework," Internet Engineering Task Force (IETF), Request for Comments: 6363, Standards Track, Oct. 2011, pp. 1-42.
(Continued)

*Primary Examiner* — Guerrier Merant
(74) *Attorney, Agent, or Firm* — Edell, Shapiro & Finnan, LLC (57) ABSTRACT

Large source data packets having large packet sizes and small source data packets having small packet sizes that are smaller than the large packet sizes are received. The small source data packets and the large source data packets are sent to a receiving device without forward error correction (FEC). The small source data packets are aggregated into a container packet having a header configured to differentiate the container packet from the large source data packets and the small source data packets. The large source data packets and the container packet are encoded with forward error correction to produce FEC-encoded packets to enable forward error correction of the large source data packets and the container packet at the receiving device. The FEC-encoded packets are sent to the receiving device.

21 Claims, 6 Drawing Sheets

(58) Field of Classification Search
CPC ..... H04L 12/4604; H04L 45/22; H04L 47/10; H04L 47/2441; H04L 47/724; H04L 47/801; H04L 65/403; G06F 11/10; H04N 19/30; H04N 21/6405; H04N 21/2662; H04N 21/6408

See application file for complete search history.

(56) References Cited

U.S. PATENT DOCUMENTS

| | | | |
|---|---|---|---|
| 6,170,075 | B1 | 1/2001 | Schuster et al. |
| 7,660,245 | B1 | 2/2010 | Luby |
| 7,716,559 | B2 | 5/2010 | Champel |
| 8,819,520 | B1 | 8/2014 | Slavetsky |
| 2002/0144209 | A1 | 10/2002 | Ariel et al. |
| 2002/0146074 | A1 | 10/2002 | Ariel et al. |
| 2002/0157058 | A1 | 10/2002 | Ariel et al. |
| 2003/0005386 | A1 | 1/2003 | Bhatt et al. |
| 2003/0135631 | A1 | 7/2003 | Li et al. |
| 2004/0123211 | A1* | 6/2004 | Kozintsev ............. H04L 1/1819 714/749 |
| 2006/0029065 | A1 | 2/2006 | Fellman |
| 2006/0048036 | A1 | 3/2006 | Miura et al. |
| 2006/0107187 | A1 | 5/2006 | Hannuksela |
| 2006/0109805 | A1 | 5/2006 | Malamal Vadakital et al. |
| 2007/0300134 | A1* | 12/2007 | Sugai ..................... H04L 1/0045 714/776 |
| 2008/0002580 | A1 | 1/2008 | Kawada et al. |
| 2008/0288986 | A1 | 11/2008 | Foster et al. |
| 2009/0016228 | A1 | 1/2009 | Ichiki |
| 2009/0138784 | A1 | 5/2009 | Tamura et al. |
| 2009/0201805 | A1 | 8/2009 | Begen et al. |
| 2009/0276686 | A1 | 11/2009 | Liu et al. |
| 2009/0295905 | A1* | 12/2009 | Civanlar ............. H04L 12/4604 348/14.09 |
| 2010/0023842 | A1 | 1/2010 | Rahrer et al. |
| 2010/0251060 | A1 | 9/2010 | Doi et al. |
| 2011/0055666 | A1 | 3/2011 | Hedaoo et al. |
| 2011/0216841 | A1 | 9/2011 | Luby et al. |
| 2013/0007567 | A1 | 1/2013 | Singh et al. |
| 2013/0111302 | A1* | 5/2013 | Cho ..................... G06F 11/10 714/776 |
| 2013/0290814 | A1 | 10/2013 | Hwang et al. |
| 2014/0314157 | A1 | 10/2014 | Hwang et al. |
| 2015/0029856 | A1 | 1/2015 | Rozenberg |
| 2015/0222555 | A1* | 8/2015 | Rickeby .................. H04L 47/34 370/230 |
| 2017/0195153 | A1* | 7/2017 | Kwak .................. H04L 27/2602 |

OTHER PUBLICATIONS

Roca, et al., "Simple Reed-Solomon Forward Error Correction (FEC) Scheme for FECFRAME," Internet Engineering Task Force (IETF), Request for Comments: 6865, Standards Track, Feb. 2013, pp. 1-23.

International Search Report and Written Opinion for counterpart International Application No. PCT/US2017/025327, dated Jul. 4, 2017, 15 pages.

Compta, et al., "Network Coding is the 56 Key Enabling Technology: effects and strategies to manage heterogeneous packet lengths," Transactions on Emerging Telecommunications Technologies, vol. 26, Nov. 2014, pp. 46-55.

Heide, et al., "Network Coding for Mobile Devices—Systematic Binary Random Rateless Codes," IEEE International Conference on Communications Workshops, 2009, ICC Workshops 2009, Jun. 2009, 6 pages.

Esmaeilzadeh et al., "Joint Optimization of Throughput and Packet Drop Rate for Delay Sensitive Applications in TDD Satellite Network Coded Systems," IEEE Transactions on Communications, vol. 62, No. 2, Feb. 2014, pp. 676-690.

* cited by examiner

EFFICIENT ERROR CORRECTION THAT AGGREGATES DIFFERENT MEDIA INTO ENCODED CONTAINER PACKETS

TECHNICAL FIELD

The present disclosure relates to protection of media content.

BACKGROUND

Media content (e.g., audio and/or video packets) may be encoded and exchanged between devices in a number of different arrangements and for a wide variety of purposes. The media may be encoded for purposes of error recovery. In a given time period, a number of video packets and a number of audio packets are collected. The audio packets are usually smaller in number and in size than the video packets. Given this disparity in number and in size, one conventional technique typically encodes the video packets and the audio packets separately to produce separate encoded streams. This approach may result in an inefficient use of encoding and transmission bandwidth. Another conventional technique simply retransmits lost voice packets, which also wastes transmission bandwidth.

DESCRIPTION OF EXAMPLE EMBODIMENTS

Overview

In an error recovery process, large source data packets having large packet sizes and small source data packets having small packet sizes that are smaller than the large packet sizes are received. The small source data packets and the large source data packets are sent to a receiving device without forward error correction (FEC). The small source data packets are aggregated into a container packet having a header configured to differentiate the container packet from the large source data packets and the small source data packets. The large source data packets and the container packet are encoded with forward error correction into FEC-encoded packets to enable forward error correction of the large source data packets and the container packet at the receiving device. The FEC-encoded packets are sent to the receiving device. In one embodiment, the container packet is not sent to the receiving device. In another embodiment, the container packet is sent to the receiving device.

Example Embodiments

Figure 1:
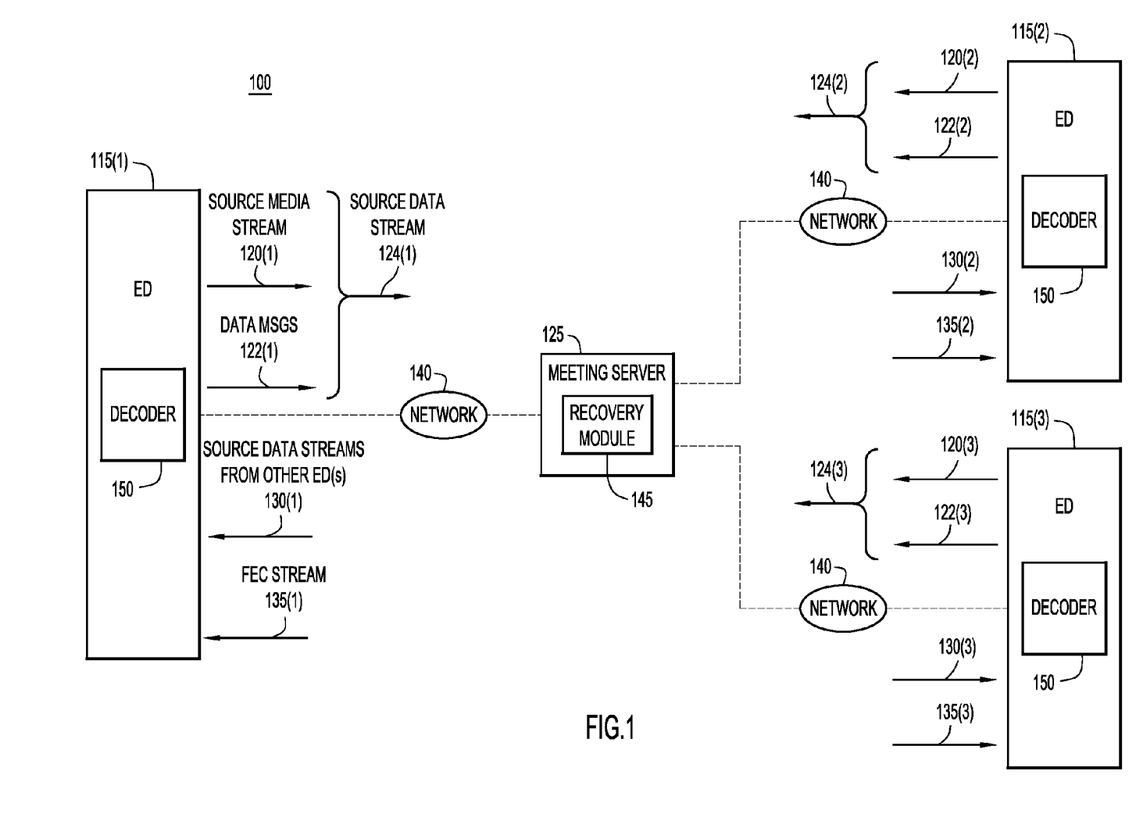
FIG. 1 is a block diagram of a system in which recovery techniques presented herein may be implemented, according to an example embodiment.

FIG. 1 is a block diagram of a system 100 in which the recovery (error correction) techniques in accordance with examples presented herein may be implemented during multi-point switching. System 100 generally enables the establishment of an online meeting/conference between two or more endpoint devices through the use of multi-stream switching of media content. Shown in the example of FIG. 1 are three endpoint devices (conference endpoints) 115 that participate in the online meeting. The endpoint devices 115 are user devices that may take on any of a number of different forms. For example, the endpoint devices may be computers (e.g., desktop computers, laptop computers, tablet computers, etc.), mobile devices (e.g., mobile phones), display screens, teleconferencing/telepresence systems, etc.

An online meeting may involve real-time sharing of media content (i.e., audio and/or video content). The video content may be content captured by a camera, desktop content (i.e., a capture of all documents, videos, images and/or any other content that is currently displayed at an endpoint device), application content (i.e., a capture of one or more specific applications currently displayed at an endpoint device), etc. As such, endpoint devices 115(1)-115(3) generate respective source media streams 120(1)-120(3) (i.e., streams of media content) to be presented at the other endpoint devices. Source media streams 120(1)-120(3) each include one or more source media packets corresponding to the media content collected/captured at endpoint devices 115(1)-115(3), respectively. In addition, endpoint devices 115 may optionally each implement one or more session control protocols to establish, maintain, and/or tear down the online meeting. In support of the session control protocols, endpoint devices 115(1)-115(3) may generate respective data messages 122(1)-122(3) in connection with the online meeting. Each combination of source media stream 120($i$) and optional data messages 122($i$) generated by each endpoint 115($i$) is referred to, generally, as a source data stream 124($i$).

Source data streams 124(1)-124(3) are provided to meeting server 125, which is configured for multi-stream switching of the captured data content (e.g., media content and data messages). Multi-stream switching refers to a scheme in which each endpoint device 115($i$) receives data streams from one or more of the other endpoint devices simultaneously, enabling the concurrent visibility (or audibility) of multiple sources during an online meeting with multiple parties. In support of multi-stream switching, meeting server 125 collects all or a subset of content from source data streams 124 and provides the collected content to endpoint devices 115(1)-115(3) in respective source data streams 130(1)-130(3). For example, source data stream 130(1) may include content collected from source data streams 124(2) and 124(3), and so on. For this reason, source data streams 130 may be referred to as consolidated data streams 130 in situations when more than two endpoint devices 115 are involved in an online meeting.

Techniques presented herein enable devices within an end-to-end data/media path to generate recovery packets that are transmitted/sent to endpoint devices in either a separate stream from, or in the same stream as data streams 130. As described further below, the recovery packets may be used at the endpoint and/or mid-point devices to perform downstream error correction of the data streams (e.g., recover/repair lost, dropped, or corrupt media and/or data message packets).

The recovery techniques are primarily described with reference to the use of forward error correction (FEC) as the mechanism that generates recovery symbols. As such, the recovery packets are sometimes referred to herein as FEC packets and a stream of such packets is sometimes referred to herein as an FEC stream. The recovery techniques may make use of a number of different conventional FEC mechanisms such as, for example, a Reed-Solomon implementation.

Returning to the example of FIG. 1, meeting server 125 generates and sends FEC streams 135(1)-135(3) downstream to endpoint devices 115(1)-115(3), respectively. FEC streams 135 may be generated in a manner that enables the source media packets and data messages in the source data streams 130 to be sent unmodified (i.e., with no added overhead) and substantially in parallel to FEC streams 135 using the same transport mechanism. In another example, FEC streams 135 may be combined with corresponding ones of source data streams 130. The source media packets and data messages within source data streams 130 and the recovery packets within FEC streams 135 may be sent using the Real-time Transport Protocol (RTP), or other transport protocols. In an example in which FEC streams 135 are sent substantially in parallel with corresponding ones of source data streams 130, this means that source media packets and data messages are sent around the same time as the FEC streams (i.e., in a sufficiently close temporal proximity to be used for recovery of the corresponding one of source data streams 130 timely to their intended use).

Meeting server 125 communicates with the endpoint devices 115 over one or more networks 140. The networks may be, for example, local area networks (LANs), wide area network (WANs), wireless WANs, wireless LANs etc., and any combination thereof. In accordance with the recovery techniques presented herein, the FEC streams 135 can be encoded/decoded at meeting server 125 and/or endpoint devices 115. In other examples, FEC streams 135 may be encoded/decoded in intermediate devices, such as network routers and switches (not shown in FIG. 1), at any hop or hops on the end-to-end path without the endpoint knowledge or associated signaling. "Encoding" is the generation of recovery (FEC) packets from a set of one or more source data packets, and "decoding" is the re-generation or recovery of missing source data packets (media or message data packets) by the combination of received recovery packets with those source data packets that are successfully received. As shown in FIG. 1, meeting server 125 may include a recovery module 145 that is configured to perform the recovery techniques (e.g., generate/encode and/or decode recovery packets). Recovery module 145 may also be included in endpoint devices 115 and the aforementioned intermediate devices. Endpoint devices 115 also includes a receiver module 150 configured to decode and use the recovery packets for FEC.

FIG. 1 illustrates one exemplary arrangement in which the recovery techniques in accordance with embodiments presented herein may be implemented. It is to be appreciated that the arrangement of FIG. 1 is merely illustrative and does not limit the use of the recovery techniques. For example, it is to be appreciated that the function of recovery module 145 may be incorporated into any device where it may be advantageously to do so as defined by, for example, the system or network designers. Additionally it is to be appreciated that in certain examples the source devices may generate recovery packets themselves; there may be no mid-point devices that participating in recovery techniques, and/or only certain mid-point devices may participate in the recovery techniques, among other possible implementations.

Figure 2:
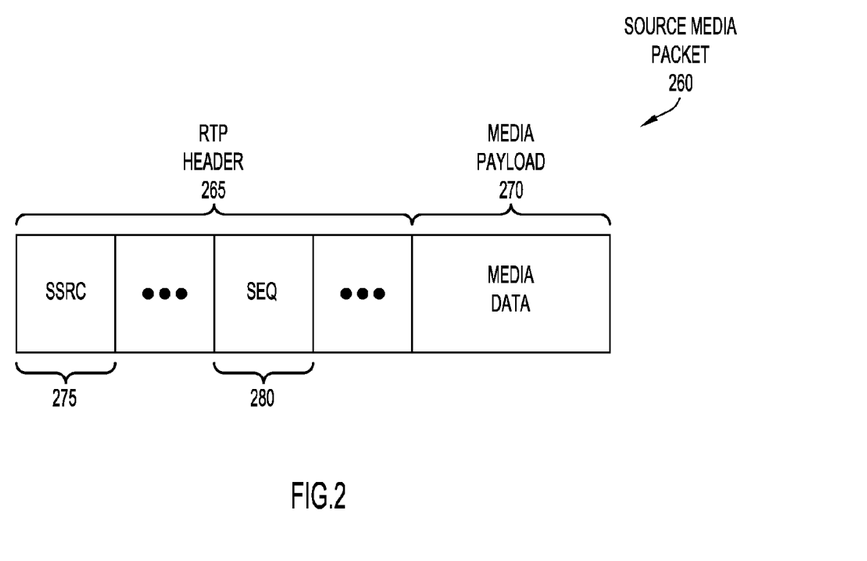
FIG. 2 is a diagram of a source media packet, such as a voice or audio packet, forming part of a media stream in accordance with example embodiments presented herein.

FIG. 2 is a diagram illustrating an example source media packet 260, such as a voice or audio/voice packet. As shown, the source media packet 260 includes an RTP header 265 and a media payload 270. Source media packet 260 may be a video packet, in which case media payload 270 includes video data. Source media packet 260 may be a voice packet, in which case media payload 270 includes audio or voice data. The RTP header 265 includes packet information, such as the synchronization source identifier (SSRC) 275 that, together with IP source and destination addresses/ports (not shown), uniquely identifies the source of the media stream, the packet sequence number (SEQ) 280 for the stream, etc.

Figure 3:
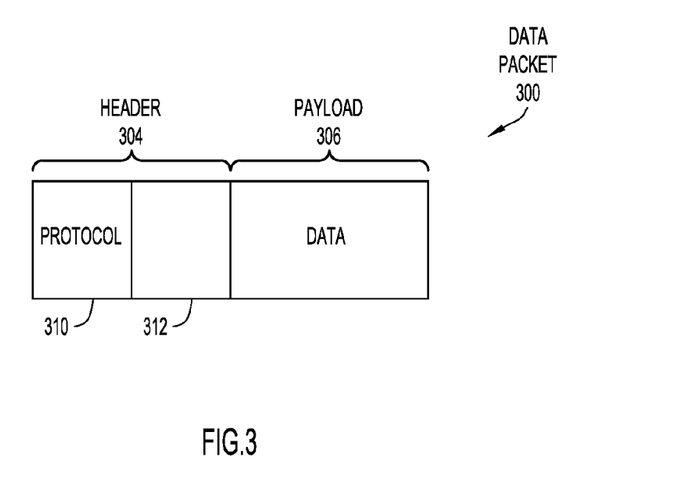
FIG. 3 is a diagram of a data packet in accordance with example embodiments presented herein.

FIG. 3 is an illustration of an example data packet 300 for a data message. Data packet 300 includes a header 304 and a data payload 306. The data in data payload 306 typically includes data that is neither video data nor voice data, which is conveyed instead in media packet 260. Header 304 may include a protocol field 310 to indicate a communication protocol associated with data packet 300, and other fields 312 associated with the indicated protocol. Data packet 300 may be associated with any number of protocols, such as the Internet Protocol (IP), Session Traversal Utilities for Network Address Translator (NAT) (STUN), File Transfer Protocol (FTP), and so on. Data packet 300 may also be a data packet that is not associated with any particular communication protocol.

In accordance with the illustrative example, meeting server 125 composes a FEC (recovery) source block from the plurality of unaltered source media packets and optionally one or more data messages taken from the one or more RTP media and data streams transmitted on a same network interface port. The entirety of the source media packets and data messages are protected, including their RTP headers, packet tags, and so on. In accordance with the techniques presented herein, the source block is formed from source media and data (message) packets received within a time-limited bound (window). The time-limited window may have a static (e.g., predetermined/selected) time length or a dynamic time length that is determined, for example, based on attributes of the individual media stream. For low-latency bi-directional communication applications it is desirable that this time-limited window be small enough to not unduly impair the effectiveness of communication, since packets are only recovered and available for consumption at the receiver at the conclusion of this time window, which may delay them relative to their ideal arrival time. The constraint on the time window necessarily constrains the size of the source block that may be obtained from a given rate of packet transmission.

After generation of the source block, one or more recovery symbols, sometimes referred to herein as FEC symbols or repair symbols, are generated from encoding the source block. These generated recovery symbols are sent in one or more RTP packets, referred to herein as a recovery packet, in a RTP FEC stream, referred to herein as the FEC stream, that is separate from the source data streams 130. However the consolidated media stream and the FEC stream are sent on the same network interface port using the same transport mechanism (e.g., RTP).

Figure 4:
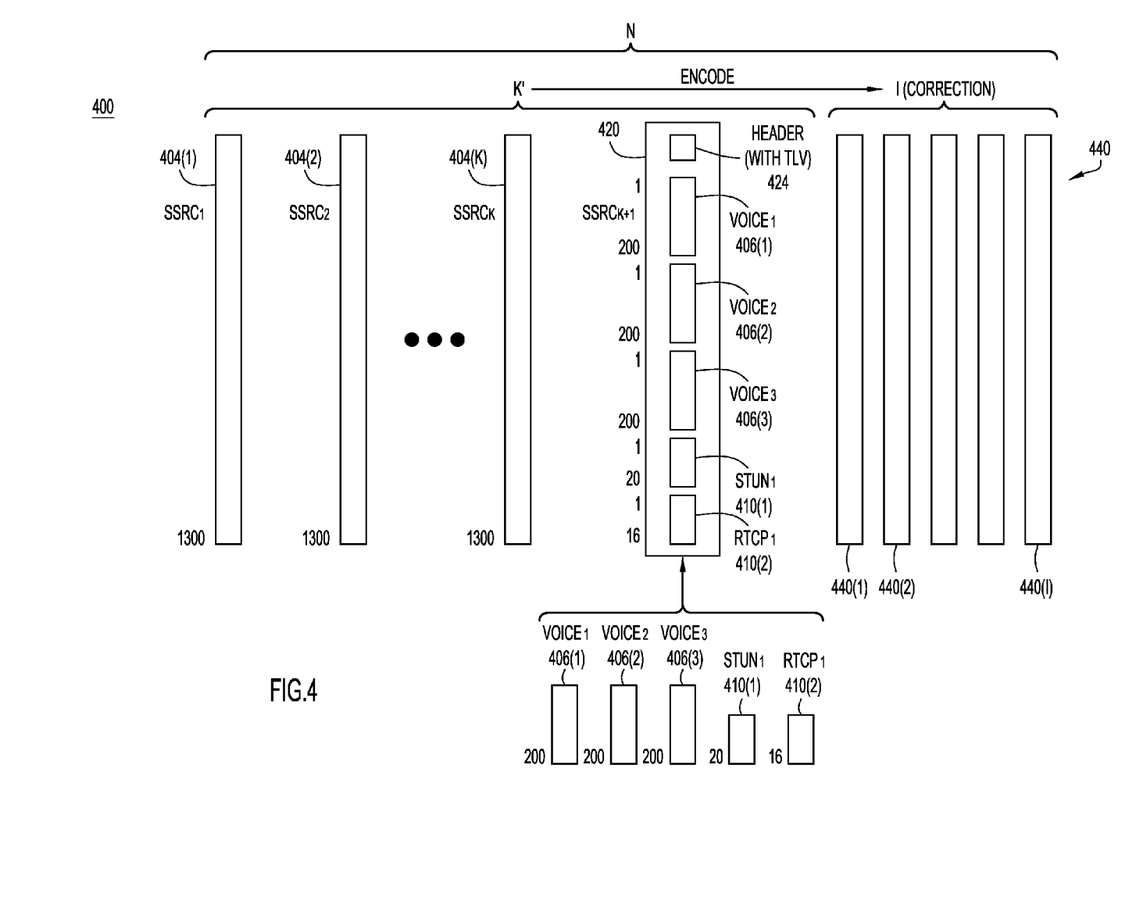
FIG. 4 is a diagram of an implementation of the recovery techniques in accordance with example embodiments presented herein.

With reference to FIG. 4, there is a diagram of an implementation of the recovery techniques. First, the recovery techniques are described briefly, and then FIG. 4 is described in detail. Similar to most Reed-Solomon (RS) FEC implementations that operate on K source packets, N-K correction packets have a length equal to a largest packet in the K source packets that the FEC covers. As a result, source packets having length significantly shorter than this length "waste" some of the coding power of the FEC. Including voice packets (typically less than 200 bytes in length) as a small source packet with large video packets (typically near a maximum transmission unit (MTU), results in inefficient FEC use. Accordingly, the recover techniques described herein define a container packet that aggregates the aforementioned small packets into a source packet to be encoded and that is input only to the FEC encoding process (it is not transmitted to the corresponding decoding process). This puts many source FEC bits—bits otherwise wasted—into the FEC encoding process. Thus, FEC protection of the small packets within the container packet comes with zero, or near zero, additional transmit bandwidth. Thus, by encoding across space (opportunistically across any other media, e.g., video), long strings of consecutive voice packet losses uncorrectable by traditional voice FEC are avoided. The container packet admits efficient FEC and the ability to recover other small packets (from the encoded container) at a near zero incremental bandwidth. This is now discussed further in connection with FIG. 4. In the ensuing description, the terms packet "length" and packet "size" are synonymous and used interchangeably.

In the example of FIG. 4, K relatively large source media packets 404(1)-404(K) of a first media type, e.g., video packets, are received from one or more sources during a selected time-limited window/period. Large source media packets 404 have lengths typically close to, but not exceeding, the MTU size (i.e., the maximum supported size for the protocol data units). In the example shown, source media packet 404(1) is received from source 1 (SSRC 1) and has a length of 1300 bytes, for source packets to be encoded, source media packet 404(2) is received from source 2 (SSRC 2) and also has a length of 1300 bytes, and so on. It should be noted that all packets 404 need not be the exact same size, but the FEC is typically formulated based on the largest size of any of the packets 404(1)-404(K).

Three relatively small source media packets 406(1)-406 (3) of a second media type, e.g., audio/voice packets $voice_1$, $voice_2$, and $voice_3$, are also received from one or more sources during the selected time-limited window/period. For example, source media packets 406 have respective lengths of 200 bytes, which is substantially less than the lengths of the large source media packets 404 and the MTU. Additionally, two relatively small (message) data packets 410(1), and 410(2), e.g., $STUN_1$ and $RTCP_1$, that are neither video nor voice media packets, are also received from one or more sources during the selected time-limited window/period. For example, data packets 410(1) and 410(2) have lengths of 120 and 16 bytes, respectively. Data packets 410 may include data messages 122 originating at endpoints 115. Alternatively, the data packets may originate at meeting server 125, an intermediate device, for example.

In addition to small source media packets 406 of the second media type (e.g., voice data) and small data packets 410, a relatively small source media packet of the first media type, e.g., a small video packet (or video packet fragment), may also be received. For example, a video packet having a length substantially less than the MTU may be received.

The small packets are containerized. For example, small source media packets 406 and small data packets 410 are containerized, i.e., aggregated into a container packet 420 having a length that is less than or equal to the largest non-containerized packets (i.e., packets 404(1)-404(K)) and that does not exceed the MTU. If a small source media packet of the first media type is also received, the small source media packet of the first media type may also be aggregated into container packet 420 along with the other small packets. In that case, container packet 420 may include source packets of three different data types, e.g., video data, voice data, and message data.

Container packet 420 includes a header 424 that includes an identifier to uniquely identify the container packet and distinguish it from first media packets 404, media packets 406, and data packets 410. Header 424 also includes a type, length, and value (TLV) field containing TLV information to demarcate each of source media packets 406 and each of data packets 410 within container packet 420.

Generally, assuming any number of small packets (first media, second media, and/or data packets) are available, as many of the small packets as possible are aggregated into container packet 420 without causing a total size of the container packet to exceed the size of the largest non-containerized packets. In one example, available small packets may be sequentially added to container packet 420. Each time a small packet (i.e., a candidate small packet) of a given size is about to be added, a determination is made as to whether a combined size of the candidate packet and a current total size of the container packet, exceeds the size of the largest non-containerized packets. If not, then the small packet is added, otherwise it is not added. Thus, candidate small packets among the available small packets are aggregated while their combined sizes (with header 424) do not exceed the size of the largest non-containerized packets.

Generation of container packet 420 results in a total of K+1 source data packets (i.e., media packets plus the container packet) to be encoded for the selected time-limited window/period. The K+1 source data packets, i.e., media packets 404 and container packet 420, are encoded into a block of I recovery (FEC) packets 440(1)-440(I) using an FEC technique.

Recovery packets 135 are transmitted/sent to a receiving device. The receiving device may include one of endpoint devices 115 or the intermediate devices. Additionally, the source packets are transmitted to the receiving device. In the example, source media packets 404 and 406, as well as data packets 410, are sent to the receiving device. In one embodiment, container packet 420 is not transmitted to the receiving device. In another embodiment, container packet 420 is sent to the receiving device. In yet another embodiment, only a subset of the source packets represented within the container packet are transmitted to the receiving device (those will be reconstituted via the FEC recovery process if possible).

In an embodiment, prior to sending the recovery packets to the receiving device, a negotiation between the device performing the encoding (the sending device) and the receiving device may be performed in which the sending device informs the receiving device of the unique header assigned to the container packet (e.g., container packet 420). This way, the receiving device may identify container packet 420 once the encoded container packet is decoded/recovered from the recovery packet into which the container packet was encoded.

At the receiving device, the source packets (e.g., the large source media packets, the small source media packets, and the data packets) and the recovery packets are received, although some of either type may be lost in transmission. Error correction based on the received recovery packets is performed. With reference to the example of FIG. 4, container packet 420, including header 424 and packets 406 and 410 therein, are recovered from the recovery packet into which the container packet was encoded. If one or more of packets 406 or 410 is not received at the receiving device, the recovered container packet is parsed based on the recovered container packet header in order to access the one or more of the missing packets. Also, if one or more of source media packets 404 are not received, the missing source media packets are recovered from the corresponding recovery packets. The above-described mapping or self-describing property of the recovery packets may be used in the recovery process at the receiving device.

Although only one container packet 420 per FEC grouping (the collection of all 400 packets) is shown if FIG. 4, it is understood that two or more container packets (i.e., multiple 420 packets) may be included in the FEC group if there are a sufficient number of smaller packets to justify multiple container packets (such as too many small packets to fit into one container packet).

Additionally, although the description above describes the use of container packets on the distribution links emanating from the meeting server 125 (FEC streams 135(1)-135(N)), such a FEC container packet strategy may be employed on the endpoint source streams (120(1)/122(1)-120(N)/122(N)) if enough small packets are generated within the time-limited window.

Figure 5:
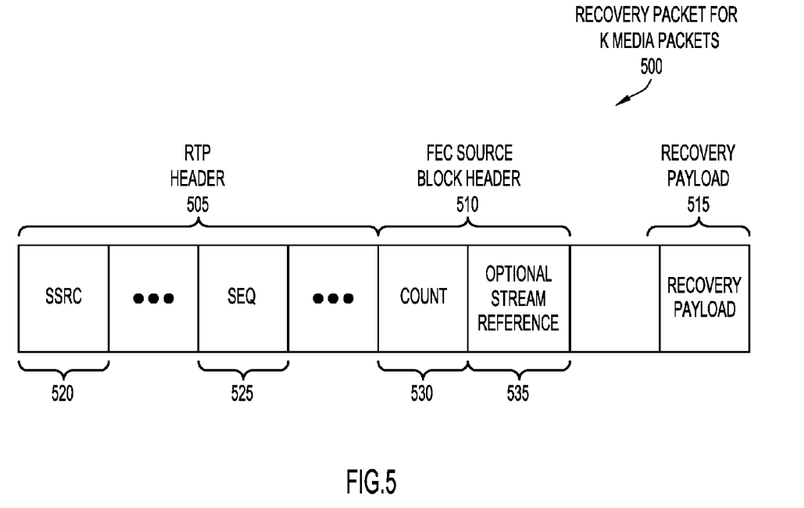
FIG. 5 is a diagram of recovery packet generated from source media packets in accordance with example embodiments presented herein.

FIG. 5 is a diagram illustrating an example recovery packet 500 representative of a recovery packet among recovery packets 440 that is generated based on one or more of source media packets 404. In the example of FIG. 5, recovery packet 500 maps to the source media packet(s) (i.e., uses a recovery/FEC-to-media mapping) that is/are encoded into the recovery packet, i.e., that are used to generate the recovery packet. This mapping or "self-describing" property of the recovery packets enables the source media packets to be sent unaltered (i.e., sent with no FEC overhead) and enables the FEC to be added/removed at any point, and to any degree, along the transmission path of the packets. This also allows FEC to be added to conventional RTP sources that are not enabled or aware that the recovery techniques are used within the end-to-end path. In another example, the mapping is not used.

As shown in FIG. 5, recovery packet 500 includes an RTP header 505, a FEC source block header 510, and a recovery payload 515. As noted above with reference to RTP header 265 of the source media packets, the RTP header 505 includes packet information (e.g., SSRC 520, Sequence Number (SEQ) 525, etc.). The FEC source block header 510 describes the composition of the source block (i.e., the packets in one or more media streams, and/or the data messages, that are collectively protected) and is followed by the recovery payload 515 that includes the recovery symbol from which source symbol recovery may be performed. The FEC source block header 510 and the recovery payload 515 are, in essence, the RTP payload for the packet 440.

In general, the FEC source block header 510 references the streams that are protected by the recovery packet 500. That is, the FEC source block header 510 includes a count 530 of streams referenced in the FEC source block header 510 and, for each referenced source media stream, a stream reference 535 describing the packets from that stream that are used in the source block. The stream reference(s) 535 may include the stream SSRC, the sequence number of the first packet from that stream referenced in this source block, and a count of contiguous packets or alternatively a bitmap which may efficiently describe discontinuous packets.

Table 1, below, identifies parameters that may be included in header 510 shown in FIG. 5.

TABLE 1

| Parameter Name/Identifier | Description |
| --- | --- |
| V | Version of the protocol. |
| Source block number | Identity of the source block with which the recovery packet is associated. Increments by a value of "1." |
| EncSymIdx | Index of the recovery packet. |
| EncSymCount (N) | Units of data generated by the encoding process (meaning number of elements in source block and recovery packet). Referred to as N in Reed-Solomon techniques. |
| SrcSymCount(K) | Number of elements in the source block. Referred to as K in the Reed-Solomon techniques. |
| RefCount | Number of consecutive blocks of packets referenced by SSRCs. |
| StreamNoSSRC | The SSRC of the protected RTP stream with implicit positioning starting from index 0 in the encoding block. |
| StrSeqStart | The first sequence number of protected RTP packets from the referenced RTP stream. |
| SeqCount | The number of consecutive RTP packets following the stream sequence number start giving the protection range. |

Figure 6:
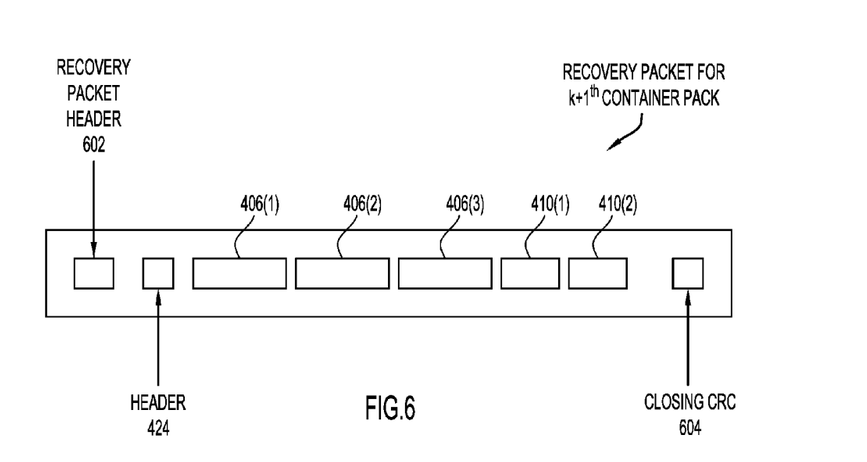
FIG. 6 is a diagram of a recovery packet generated from a container packet in accordance with example embodiments presented herein.

FIG. 6 is a diagram illustrating an example recovery packet 600 representative of a recovery packet among recovery packets 440 that is generated based on container packet 420. Recovery packet 600 includes the contents of container packet 420 as represented in FIG. 4. In addition, recovery packet 600 includes a recovery packet header 602 and a closing Cyclic Redundancy Check (CRC) 604, such as a 32 bit checksum.

Figure 7:
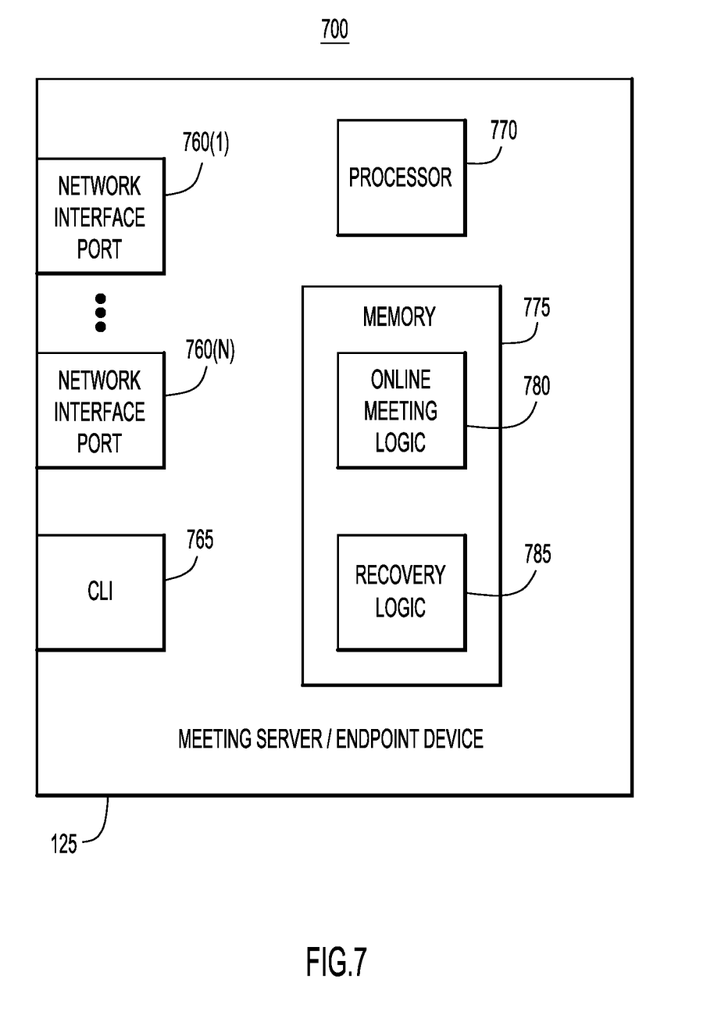
FIG. 7 is a block diagram of a device configured to generate recovery packets in accordance with example embodiments presented herein.

FIG. 7 is a block diagram of a device 700, such as meeting server 125, one of endpoint devices 115, or an intermediate node/device, such as a router, configured to operate in accordance with examples presented herein to generate recovery packets sent with a consolidated media stream. As shown, device 700 comprises a plurality of network interface units (e.g., ports) 760(1)-260(N), a command-line interface (CLI) 765 if device 700 represents server 125, a processor 770, and a memory 775 comprising online meeting software/logic 780 and recovery logic 785.

The network interface units 760(1)-760(N) provide network communications between the meeting server and the end-point devices, mid-pint devices, and/or other network components. Network interface units 760(1)-760(N) may be, for example, Ethernet ports of a network interface card (NIC) implemented in one or more application-specific integrated circuits (ASICs). The CLI 765 is a mechanism by which commands can be delivered to the meeting server 125 in the form of successive lines of text (command lines). It should be appreciated that use of the CLI 765 is merely an example and that other mechanisms may also or alternatively be provided for a network administrator to deliver commands to the meeting server 125.

Memory 775 may comprise read only memory (ROM), random access memory (RAM), magnetic disk storage media devices, optical storage media devices, flash memory devices, electrical, optical, or other physical/tangible memory storage devices. The processor 770 is, for example, a microprocessor or microcontroller that executes instructions for the online meeting logic 780 and the recovery logic 785. Thus, in general, the memory 775 may comprise one or more tangible (non-transitory) computer readable storage media (e.g., a memory device) encoded with software comprising computer executable instructions and when the software is executed (by the processor 770) it is operable to perform the operations in connection with setting up and/or hosting an online meeting (through execution of online meeting logic 780) and to perform the operations described herein with connection to the recovery techniques (through execution of recovery logic 785).

Figure 8:
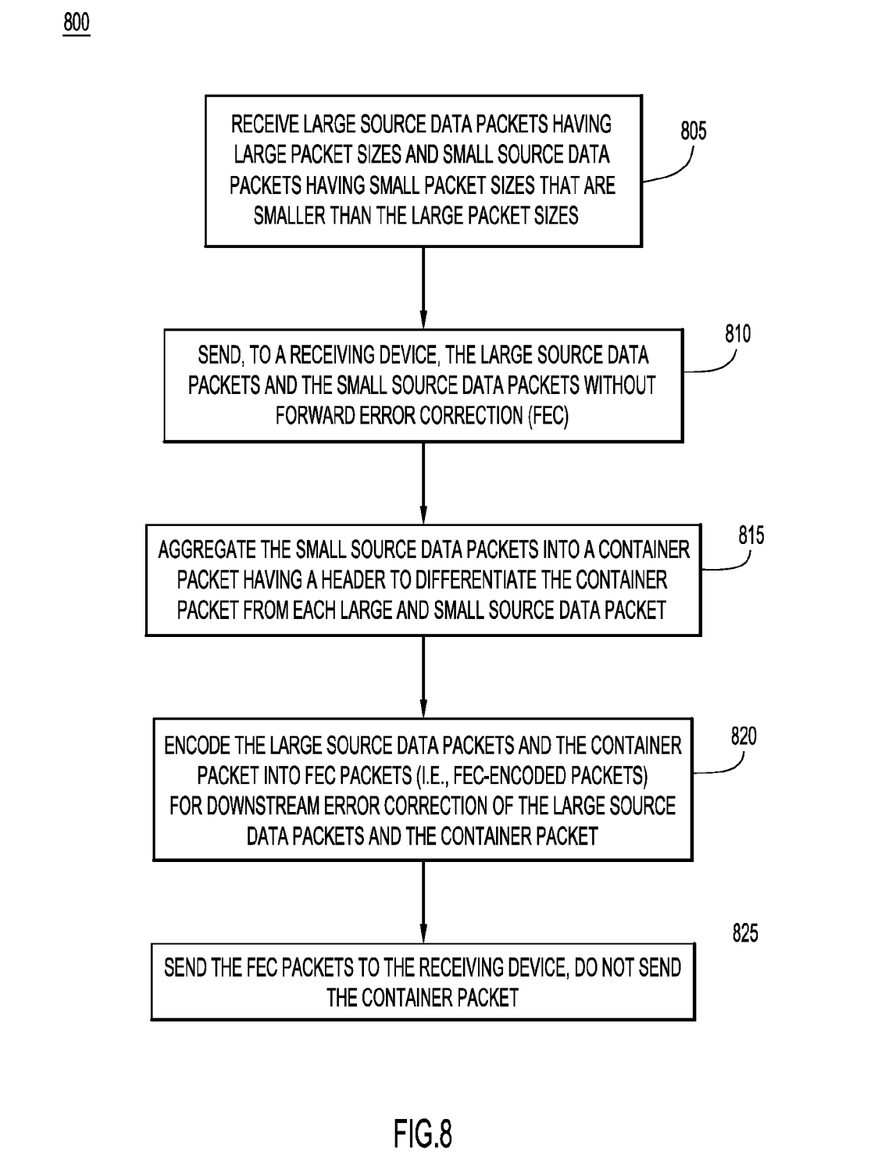
FIG. 8 is a flowchart of a method in accordance with example embodiments presented herein.

FIG. 8 is a flowchart of a method 800 in accordance with examples presented herein. The method may be performed in meeting server 125, endpoints 115, or an intermediate node. In the description of method 800, recovery packets are referred to as FEC packets.

At 805, small (i.e., first) source data packets having relatively large packet sizes and small (i.e., second) source data packets having relatively small packet sizes that are smaller than the relatively large packet sizes are received. The large source data packets and the small source data packets may each contain media data of a first media type. Alternatively, the large source data packets may contain media data of a first media type (e.g., video data) and the small source data packets may contain media data of one or more second media types (e.g., voice data and/or data that is neither video data nor voice data).

At 810, the large source data packets and the small source data packets are sent to a receiving device, without FEC.

At 815, the small source data packets (e.g., voice, data, or voice and data) are aggregated into a container packet having a header to differentiate the container packet from each large source data packet and each small source data packet. The small source data packets, when aggregated, have a total or combined size (with container header) that does not exceed an MTU that applies across the large and small source data packets, or that does not exceed a size of a largest one of the large source data packets.

At 820, the large source data packets and the container packet are encoded into FEC packets (also referred to as "FEC-encoded packets") for downstream error correction of the large source data packets and the container packet.

At 825, the FEC packets are sent to the receiving device. In one embodiment, the container packet is not sent to the receiving device. In another embodiment, the container packet is sent to the downstream receiving device.

Although the description above depicts only one container packet per FEC grouping (the collection of all 400 packets), it should be apparent by a person skilled in the art that two or more container packets can be included in the FEC group (i.e., multiple 420 packets) if there are a sufficient number of smaller packets to justify multiple packets (such as too many small packets to fit into one container packet).

Additionally, although the description above describes the use of container packets on the distribution links emanating from the meeting server 125 (FEC streams 135(1)-135(N)), such a FEC container packet strategy may be employed on the endpoint source streams (120(1)/122(1)-120(N)/122(N)) if enough small packets are generated within the time-limited window.

In another embodiment, relatively small source data packets of the first data type (e.g., small video packets) may also be received and aggregated into the container packet along with the small source data packets of data types that are different from the first data type.

In summary, using techniques described above, voice packets may be forward error corrected with video media to take advantage of efficient FEC codes employed across the video media. Long strings of consecutive voice packet losses on a given voice SSRC not correctable by traditional voice XOR FEC are thus circumvented, which improves voice/audio quality. The techniques effectively define a container packet (not sent on the wire) to that aggregates voice packets (and optionally other small packets) into a source FEC packet (i.e., a source packet to be input into the FEC encoding process) that puts otherwise wasted/unused encoding bandwidth (of the FEC encoding process) to good use. Via these techniques, error correction protection of N-1 of the small packets within the container comes at zero increase in bandwidth In summary, in one form, a method is provided comprising: receiving large source data packets having large packet sizes and small source data packets having small packet sizes that are smaller than the large packet sizes; sending, to a receiving device, the small source data packets and the large source data packets without forward error correction (FEC); aggregating the small source data packets into a container packet having a header configured to differentiate the container packet from the large source data packets and the small source data packets; encoding the large source data packets and the container packet with forward error correction into FEC-encoded packets to enable forward error correction of the large source data packets and the container packet; and sending the FEC-encoded packets to the receiving device.

In another form, an apparatus is provided comprising: a network interface unit to connect with a network; a processor coupled to the network interface unit and configured to: receive large source data packets having large packet sizes and small source data packets having small packet sizes that are smaller than the large packet sizes; send, to a receiving device, the small source data packets and the large source data packets without forward error correction (FEC); aggregate the small source data packets into a container packet having a header configured to differentiate the container packet from the large source data packets and the small source data packets; encode the large source data packets and the container packet with forward error correction into FEC-encoded packets to enable forward error correction of the large source data packets and the container packet; and send the FEC-encoded packets to the receiving device.

In still another form, one or more non-transitory computer readable storage media are provided encoded with software comprising computer executable instructions and when the software is executed operable to receive large source data packets having large packet sizes and small source data packets having small packet sizes that are smaller than the large packet sizes; send, to a receiving device, the small source data packets and the large source data packets without forward error correction (FEC); aggregate the small source data packets into a container packet having a header configured to differentiate the container packet from the large source data packets and the small source data packets; encode the large source data packets and the container packet with forward error correction into FEC-encoded packets to enable forward error correction of the large source data packets and the container packet; and send the FEC-encoded packets to the receiving device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

receiving, at a device in a computer network, large source data packets having large packet sizes and small source data packets having small packet sizes that are smaller than the large packet sizes;

sending, to a receiving device, the small source data packets and the large source data packets without forward error correction (FEC);

aggregating the small source data packets into a container packet and generating a header configured to differentiate the container packet from the large source data packets and the small source data packets;

encoding the large source data packets and the container packet with forward error correction into FEC-encoded packets to enable forward error correction of the large source data packets and the container packet; and sending the FEC-encoded packets to the receiving device, wherein the aggregating includes aggregating as many of the small source data packets as possible into the container packet without causing a total size of the container packet to exceed a predetermined maximum packet size that limits the packet sizes of the large source data packets and the container packet so that sending the FEC-encoded container packet requires no additional transmit bandwidth.

2. The method of claim 1, further comprising not sending the container packet to the receiving device.

3. The method of claim 1, wherein the large source data packets include media data of a first media type and the small data packets include media data of a second media type different from the first media type.

4. The method of claim 3, wherein the large source data packets include video data and small source data packets include voice data.

5. The method of claim 4, wherein the small data packets further include data that are neither video data nor voice data.

6. The method of claim 1, wherein the header of the container packet includes (i) a unique identifier indicative of a container packet that differentiates the container packet from the large source data packets and the small source data packets, and (ii) information that demarcates each of the small source data packets within the container packet.

7. The method of claim 6, wherein:

each large source data packet and each small source data packet includes a stream synchronization source identifier of a stream of source media packets to which the source data packet belongs, and a sequence number of the source data packet within the stream of source data packets.

8. The method of claim 6, wherein the FEC-encoded packets include mappings to corresponding ones of the large source data packets and the container packet, which mappings are encoded into the FEC-encoded packets.

9. The method of claim 6, further comprising, at the receiving device, performing forward error correction based on the FEC-encoded packets, the performing forward error correction including:

recovering from the FEC-encoded packets the container packet including the header in the container packet and the small source data packets therein; and if one or more of the small source data packets is not received at the receiving device, parsing the recovered container packet based on the time-length-value (TLV) information in the header to access the one or more of the small source data packets therein.

10. The method of claim 9, wherein the FEC-encoded packets include mappings to corresponding ones of the large source data packets and to the container packet which are encoded into the FEC-encoded packets, wherein the performing forward error correction further includes:

if one or more of the large source data packets is not received at the receiving device, recovering from the FEC-encoded packets the one or more large source data packets based on the mappings.

11. The method of claim 1, further comprising, prior to the sending the FEC-encoded packets, negotiating header information for the header of the container packet with the receiving device.

12. An apparatus comprising:

a network interface unit to connect with a network;

a processor coupled to the network interface unit and configured to:

receive large source data packets having large packet sizes and small source data packets having small packet sizes that are smaller than the large packet sizes;

send, to a receiving device, the small source data packets and the large source data packets without forward error correction (FEC);

aggregate the small source data packets into a container packet having a header configured to differentiate the container packet from the large source data packets and the small source data packets;

encode the large source data packets and the container packet with forward error correction into FEC-encoded packets to enable forward error correction of the large source data packets and the container packet; and send the FEC-encoded packets to the receiving device, wherein the processor is configured to aggregate as many of the small source data packets as possible into the container packet without causing a total size of the container packet to exceed a predetermined maximum packet size that limits the packet sizes of the large source data packets and the container packet so that sending the FEC-encoded container packet requires no additional transmit bandwidth.

13. The apparatus of claim 12, wherein the processor is further configured to not send the container packet to the receiving device.

14. The apparatus of claim 12, wherein the header of the container packet includes (i) a unique identifier indicative of a container packet that differentiates the container packet from the large source data packets and the small source data packets, and (ii) information that demarcates each of the small source data packets within the container packet.

15. The apparatus of claim 12, wherein the large source data packets include media data of a first media type and the small data packets include media data of a second media type different from the first media type.

16. The apparatus of claim 14, wherein the FEC-encoded packets include mappings to corresponding ones of the large source data packets and the container packet, which mappings are encoded into the FEC-encoded packets.

17. A non-transitory computer readable storage media encoded with instructions that, when executed by a processor, cause the processor to:

receive large source data packets having large packet sizes and small source data packets having small packet sizes that are smaller than the large packet sizes;

send, to a receiving device, the small source data packets and the large source data packets without forward error correction (FEC);

aggregate the small source data packets into a container packet having a header configured to differentiate the container packet from the large source data packets and the small source data packets;

encode the large source data packets and the container packet with forward error correction into FEC-encoded packets to enable forward error correction of the large source data packets and the container packet; and send the FEC-encoded packets to the receiving device, wherein the instructions cause the processor to aggregate as many of the small source data packets as possible into the container packet without causing a total size of the container packet to exceed a predetermined maximum packet size that limits the packet sizes of the large source data packets and the container packet so that sending the FEC-encoded container packet requires no additional transmit bandwidth.

18. The apparatus of claim 17, further comprising instructions to cause the processor to not send the container packet to the receiving device.

19. The apparatus of claim 17, wherein the header of the container packet includes (i) a unique identifier indicative of a container packet that differentiates the container packet from the large source data packets and the small source data packets, and (ii) information that demarcates each of the small source data packets within the container packet.

20. The apparatus of claim 17, wherein the large source data packets include media data of a first media type and the small data packets include media data of a second media type different from the first media type.

21. The apparatus of claim 19, wherein the FEC-encoded packets include mappings to corresponding ones of the large source data packets and the container packet which are encoded into the FEC-encoded packets.

* * * * *